United States Patent [19]

Bock et al.

[11] Patent Number: 5,574,123
[45] Date of Patent: Nov. 12, 1996

[54] HEAT CURABLE, ONE-COMPONENT POLYURETHANE REACTIVE COMPOSITIONS

[75] Inventors: Manfred Bock, Leverkusen; Holger Casselmann, Bergisch Gladbach; Werner Drouvé; Gerhard Grogler, both of Leverkusen; Richard Kopp; Heinrich Hess, both of Köln, all of Germany

[73] Assignee: Bayer Aktiengesellschaft, Leverkusen, Germany

[21] Appl. No.: 396,182

[22] Filed: Feb. 24, 1995

[30] Foreign Application Priority Data

Mar. 7, 1994 [DE] Germany ................... 44 07 490.5

[51] Int. Cl.$^6$ .................... C08G 18/42; C08G 18/50; C08G 18/80
[52] U.S. Cl. ................ 528/45; 528/60; 528/61; 528/66; 528/76; 528/80; 528/83
[58] Field of Search ................ 528/45, 76, 80, 528/83, 60, 61, 66

[56] References Cited

U.S. PATENT DOCUMENTS

| | | | |
|---|---|---|---|
| 4,400,497 | 8/1983 | Blum et al. | 528/45 |
| 4,483,974 | 11/1984 | Grögler et al. | 528/68 |
| 4,525,570 | 6/1985 | Blum et al. | 528/75 |
| 4,546,165 | 10/1985 | Grögler et al. | 528/73 |
| 4,595,445 | 6/1986 | Hombach et al. | 156/307.3 |
| 4,619,985 | 10/1986 | Hess et al. | 528/73 |
| 4,716,182 | 12/1987 | Hess et al. | 528/78 |
| 4,797,320 | 1/1989 | Kopp et al. | 428/316.6 |
| 4,847,321 | 7/1989 | Hess et al. | 528/60 |
| 4,882,408 | 11/1989 | Blum | 528/49 |
| 5,077,339 | 12/1991 | Grögler et al. | 528/76 |
| 5,091,497 | 2/1992 | Grögler et al. | 528/76 |
| 5,104,959 | 4/1992 | Hess et al. | 528/79 |
| 5,109,096 | 4/1992 | Hess et al. | 528/49 |
| 5,143,995 | 9/1992 | Meckel et al. | 528/59 |
| 5,183,876 | 2/1993 | Kopp et al. | 528/59 |
| 5,185,422 | 2/1993 | Drouvé et al. | 528/76 |

*Primary Examiner*—James J. Seidleck
*Assistant Examiner*—Rabon Sergent
*Attorney, Agent, or Firm*—Joseph C. Gil; Thomas W. Roy

[57] ABSTRACT

The present invention relates to a heat curable, one-component polyurethane reactive compositions containing A) surface-modified, finely divided polyisocyanates in which 0.1 to 25 equivalent percent, based on the total number of NCO groups, of the NCO groups are deactivated and B) a mixture of relatively high molecular weight compounds having isocyanate-reactive groups containing
1) 5 to 40 wt. %, based on the weight of component B), of one or more aliphatic polyether polyamines and
2) 60 to 95 wt. %, based on the weight of component B), of a polyol mixture containing
   i) 10 to 60 wt. %, based on the weight of component B2), of at least one polyester polyol and
   ii) 40 to 90 wt. %, based on the weight of component B2), of at least one polyether polyol with predominantly primary hydroxyl groups.

The present invention also relates to use of the heat curable, one-component polyurethane reactive compositions to prepare coatings, adhesives, anti-drumming products and sealants, especially seam sealants.

4 Claims, No Drawings

HEAT CURABLE, ONE-COMPONENT POLYURETHANE REACTIVE COMPOSITIONS

BACKGROUND OF THE INVENTION

1. Field of the Invention

The present invention relates to heat curable, one-component polyurethane reactive compositions for sealing and coating purposes, which have low brushing or spraying viscosities, good longterm flexibility, good overbaking resistance and good adhesion to cathodically electrocoated sheet metal, and which may be cured without blisters and with unimpaired final strength even after storage in an uncured state in humid air.

2. Description of the Prior Art

The use of suspensions of solid polyisocyanates, which have been deactivated by superficial polyadduct formation, in liquid or low-melting compositions containing hydrogen atoms capable of reacting with isocyanates, in particular polyhydroxyl or polyamino compounds, as heat curable adhesive, sealing, coating or embedding compositions and for the production of moldings is known (DE-OS 3,112,054, 3,228,723, 3,230,757, 3,403,499, 3,724,555, 3,919,696, 3,919,697).

A common feature of all of these one-component polyurethane reactive compositions is that they may not be stored for very long in their uncured state in humid air without blistering occurring on curing. The blistered structure of the one-component polyurethane reactive compositions arises from the participation of absorbed water in the curing reaction. This blistering is highly undesirable as it impairs the strength of the cured reactive composition and its adhesion. Moreover, if the one-component polyurethane reactive compositions absorb very large quantities of moisture, the actual curing reaction may fail to occur.

In practice, freshly applied adhesive, sealing or coating compositions which have not yet been thermally solidified may sometimes be exposed to humid air for several days before entering the baking oven. This is the case in motor vehicle production when the line is shut down over a weekend. For this reason, curing without blisters and with sufficient strength after relatively extended exposure to humid air is of particular importance to the automotive industry.

While the use of polyether polyamines or the addition of water-absorbing fillers, for example, zeolites, may suppress the water reaction, other disadvantages associated with the use of these formulation components must be accepted. Aliphatic amines are not only costly, but also irritate human skin; aromatic amines are questionable in terms of health; and inorganic fillers such as zeolites very sharply increase the viscosity of the one-component polyurethane reactive compositions. In many cases, zeolites inactivate the added curing catalyst by absorption. While the silane coupling agents described in DE-OS 4,111,654 impart improved resistance to the action of atmospheric humidity to one-component polyurethane reactive compositions, a very large quantity is required.

An object of the present invention is to provide improved one-component polyurethane reactive compositions which have the lowest possible content of polyether polyamines and cure without blisters even after relatively extended storage in humid air.

It has now surprisingly been found that this object may be achieved with the one-component polyurethane reactive compositions according to the present invention, which cure without blisters by the use of certain mixtures of polyether polyols and polyester polyols, even when these compositions have been exposed to relative atmospheric humidity of 55% for three days.

The one-component polyurethane reactive compositions moreover exhibit good resistance to elevated baking temperatures of between 180° and 200° C., in particular when 3,3'-diisocyanato-4,4'-dimethyl-N,N'-diphenylurea is used as the isocyanate component. Softening, decomposition and foaming occur with other isocyanates at these temperatures.

SUMMARY OF THE INVENTION

The present invention relates to a heat curable, one-component polyurethane reactive compositions containing A) surface-modified, finely divided polyisocyanates in which 0.1 to 25 equivalent percent, based on the total number of NCO groups, of the NCO groups are deactivated and B) a mixture of relatively high molecular weight compounds having isocyanate-reactive groups containing
1) 5 to 40 wt. %, based on the weight of component B), of one or more aliphatic polyether polyamines and
2) 60 to 95 wt. %, based on the weight of component B), of a polyol mixture containing
   i) 10 to 60 wt. %, based on the weight of component B2), of at least one polyester polyol and
   ii) 40 to 90 wt. %, based on the weight of component B2), of at least one polyether polyol with predominantly primary hydroxyl groups.

The present invention also relates to use of the heat curable, one-component polyurethane reactive compositions to prepare coatings, adhesives, anti-drumming products and sealants, especially seam sealants.

DETAILED DESCRIPTION OF THE INVENTION

Suitable starting components for the surface-modified, finely divided polyisocyanates A) used according to the invention are di- or polyisocyanates and mixtures thereof, provided that they have a melting point above 40° C., preferably above 80° C., and more preferably above 130° C.

Suitable polyisocyanates include aliphatic, cycloaliphatic, araliphatic, and preferably aromatic or heterocyclic polyisocyanates, such as polyphenyl/polymethylene polyisocyanates obtained by aniline/formaldehyde condensation and subsequent phosgenation as described, for example, in British patents 874,430 and 848,671. Also suitable are perchlorinated aryl polyisocyanates, polyisocyanates containing carbodiimide groups, polyisocyanates containing allophanate groups, polyisocyanates containing isocyanurate groups, polyisocyanates containing urethane and/or urea groups, polyisocyanates containing acylated urea groups, polyisocyanates containing biuret groups, polyisocyanates produced by telomerization reactions, polyisocyanates containing ester groups, preferably diisocyanates containing uretidione groups and diisocyanates containing urea groups.

Examples include:

| | mp: |
|---|---|
| p-xylylene diisocyanate | 45–46° C. |
| 1,5-diisocyanatomethylnaphthalene | 88–89° C. |
| 1,3-phenylene diisocyanate | 51° C. |

-continued

| | mp: |
|---|---|
| 1,4-phenylene diisocyanate | 94–96° C. |
| 1-methylbenzene 2,5-diisocyanate | 39° C. |
| 1,3-dimethylbenzene 4,6-diisocyanate | 70–71 ° C. |
| 1,4-dimethylbenzene 2,5-diisocyanate | 76° C. |
| 1-nitrobenzene 2,5-diisocyanate | 59–61° C. |
| 1,4-dichlorobenzene 2,5-diisocyanate | 134–137° C. |
| 1-methoxybenzene 2,4-diisocyanate | 75° C. |
| 1-methoxybenzene 2,5-diisocyanate | 89° C. |
| 1,3-dimethoxybenzene 4,6-diisocyanate | 125° C. |
| Azobenzene 4,4'-diisocyanate | 158–161° C. |
| Diphenylether 4,4'-diisocyanate | 66–68° C. |
| Diphenylmethane 4,4'-diisocyanate | 42° C. |
| Diphenyldimethylmethane 4,4'-diisocyanate | 92° C. |
| Naphthalene 1,5-diisocyanate | 130–132° C. |
| 3,3'-dimethylbiphenyl 4,4'-diisocyanate | 68–69° C. |
| Diphenyldisulphide 4,4'-diisocyanate | 58–60° C. |
| Diphenylsulphone 4,4'-diisocyanate | 154° C. |
| 1-methylbenzene 2,4,6-triisocyanate | 75° C. |
| 1,3,5-trimethylbenzene 2,4,6-triisocyanate | 93° C. |
| Triphenylmethane 4,4',4"-triisocyanate | 89–90° C. |
| 4,4'-Diisocyanato-(1,2)-diphenylethane | 88–90° C. |
| Dimeric 1-methyl-2,4-phenylene diisocyanate | 156° C. |
| Dimeric 1-isopropyl-2,4-phenylene diisocyanate | 125° C. |
| Dimeric 1-chloro-2,4-phenylene diisocyanate | 177° C. |
| Dimeric 2,4'-diisocyanatodiphenylsulphide | 178–180° C. |
| 3,3'-diisocyanato-4-4'-dimethyl-N,N'-diphenylurea | |
| 3,3'-diisocyanato-2,2'-dimethyl-N,N'-diphenylurea | |
| 3,3'-diisocyanato-2,4'-dimethyl-N,N'-diphenylurea | |
| N,N'-bis[4(4-isocyanatophenylmethyl)phenyl]urea | |
| N,N'-bis[4(2-isocyanatophenylmethyl)phenyl]urea. | |

Dimeric 1-methyl-2,4-diisocyanatobenzene, dimeric-4,4'-diisocyanatodiphenylmethane, 3,3'-diisocyanato-4,4'-or -2,2'- or-2,4'-dimethyl-N,N'-diphenylurea or modification products of 3,3'-diisocyanato-4,4'- or -2,2'- or-2,4'-dimethyl-N,N'-diphenyl urea with long-chain polyethers and/or polyesters, bis-N,N'-[4-(4-isocyanatophenylmethyl)-phenyl]ureaandnaphthalene 1,5-diisocyanate are preferred according to the invention. The dimeric diisocyanates may also be produced in finely divided form by in situ dimerization (for example, in plasticizers, solvents, water or polyols) and optionally stabilized in this form.

The stabilizers for the polyisocyanates include di- or polyfunctional, low or relatively high molecular weight compounds having aliphatically attached, primary and/or secondary amino groups and a molecular weight of 60 to approximately 6000, preferably 60 to 300. These are low molecular weight and/or relatively high molecular weight primary and/or secondary polyamines, preferably with functionalities of 2 to 3, or mixtures thereof. In these compounds, the amino groups are attached to aliphatic groups (including cycloaliphatic groups or groups attached to the aliphatic residue of araliphatic groups). The aliphatic or cycloaliphatic di- and polyamines may, in addition to the amino groups, optionally contain OH groups, tertiary amino groups, ether groups, thioether groups, urethane groups, urea groups, carboxyl groups, carboxylic acid alkyl ester groups, sulphonate groups, carboxylate groups or sulphonic acid ester groups.

Di- and polyamines which may be used according to the invention include ethylenediamine, 1,2- and 1,3-propanediamine, 1,4-butane-diamine, 1,6-hexane-diamine, neopentanediamine, 2,2,4- and 2,4,4-trimethyl-1,6-diaminohexane, 2,5-dimethyl-2,5-diaminohexane, 1,10-decanediamine, 1,11-undecane-diamine, 1,12-dodecanediamine, bis-aminomethyl-hexahydro-4,7-methanoindane (TCD diamine), 1,3-cyclo-hexanediamine, 1,4-cyclohexanediamine, 1-amino-3,3,5-trimethyl-5-aminomethylcyclohexane (isophorone-diamine), 2,4- and/or 2,6-hexa-hydrotolylenediamine, 2,4'- and/or 4,4 '-diaminodicyclohexylmethane, m-orp-xylylenediamine, bis-(3-aminopropyl)methylamine, bis-N,N'-(3-amino-propyl)piperazine, 1-amino-2-aminomethyl-3,3,5-(3,5,5)-trimethylcyclo-pentane, 2,2-dialkylpentane-1,5-diamines, 1,5,11-triaminoundecane, 4-aminomethyl-1,8-diaminooctane, lysine methyl ester, cycloaliphatic triamines according to DE-OS 2,614,244, 4,7-dioxadecane-1,10-diamine, 2,4-and/or 2,6-diamino-3,5-diethyl- 1-methylcyclohexane, alkylated diaminodicyclohexylmethanes (for example 3,3'-dimethyl-4,4'-diamino-dicyclohexylmethane or 3,5-diisopropyl-3',5'-diethyl-4,4'-diaminodicyclo-hexylmethane), perhydrogenated diaminonaphthalenes, perhydrogenated diaminoanthracenes, diethylenetriamine, triethylenetetramine, penta-ethylenehexamine, dipropylenetriamine, tripropylenetetramine, N,N'-dimethylethylenediamine, 2,5-dimethylpiperazine, 2-methylpiperazine, piperazine hydrate, 2-hydroxy-ethylpiperazine or sodium 2-(2-aminoethyl)-aminoethylsulphonate.

Instead of these low molecular weight aliphatic diamines, it is also possible to use aliphatic polyether polyamines, such as those obtained by the reductive amination of polyoxyalkylene glycols with ammonia according to Belgian patent BE 634,741 or U.S. Pat. No. 3,654,370. Further polyether polyamines may be produced using methods as listed in the brochure "Jeffamine, Polyoxypropylene Amines" published by Texaco Chemical Co., 1978, for example by hydrogenation of cyanoethylated polyoxypropylene glycols (DE-OS 1,193,671), by amination of polypropylene glycol sulphonic acid esters (U.S. Pat. No. 3,236,895), by treating polyoxyalkylene glycols with epichlorohydrin and a primary amine (FR 1,466,708) or by the reaction of NCO prepolymers with enamines, aldimines or ketimines having hydroxyl groups followed by hydrolysis according to DE-A 2,546,536.

Suitable relatively high molecular weight di-and polyamines also include the polyamines obtained according to DE-OS 2,948,419 and DE-OS 3,039,600 by alkaline hydrolysis of NCO prepolymers (prepared from aliphatic diisocyanates) with bases via a carbamate stage. These relatively high molecular weight polyether polyamines have molecular weights of approximately 400 to 6000, preferably of 400 to 3000 and more preferably 1000 to 3000.

The relatively high molecular weight polyether polyamines are preferably used in admixture with the low molecular weight di- and polyamino compounds in order to achieve amine stabilization of the polyisocyanate particles.

Other stabilizers include hydrazine, alkylhydrazines and N,N'-dialkylhydrazines, preferably with $C_1$–$C_6$ alkyl groups, which may also have chlorine or OH groups as further substituents, and di- or more highly functional, low or relatively high molecular weight compounds having —CO—NH—$NH_2$ terminal groups, and a molecular weight of 32 to approximately 6000, preferably 32 to 3000. These substances include hydrazine, generally in the form of hydrazine hydrate, and alkyl-substituted hydrazines such as methylhydrazine, ethylhydrazine, hydroxyethylhydrazine or N,N'-dimethylhydrazine.

Further suitable stabilizers are compounds having hydrazide terminal groups, e.g., di- or polyhydrazides such as carbodihydrazide, hydracrylic acid hydrazide, oxalic acid dihydrazide, adipic acid dihydrazide, terephthalic acid dihydrazide, isophthalic acid hydrazide; and compounds having at least two hydrazide, semicarbazide, carbazine ester and/or amino groups, e.g., β-semicarbazido-propionic acid hydrazide, 2-semicarbazidoethylenecarbazine ester, aminoacetic acid hydrazide, β-aminopropionic acid hydrazide, biscarbazine esters or bis-semicarbazides (such as ethylenebis-semicarbazine ester or ethylene-bis-semicarbazide or isophorone-bis-semicarbazide). Hydrazine and low molecular weight compounds having —CO—NH—NH$_2$ groups and molecular weights of 32 to 399 are preferred. Hydrazine hydrate, β-semicarbazide-propionic acid hydrazide and alkylene bis-semicarbazides are particularly preferred.

The stabilizers are generally used in a quantity of approximately 0.1 to 25, preferably 0.2 to 8 equivalent-% amine, based on the isocyanate equivalents of the solid, finely divided isocyanate component.

The reaction temperature selected for the encapsulation reaction is a temperature below the melting temperature of the particular polyisocyanate. The temperature is generally below 70° C., preferably 0° to 50° C. The solid polyisocyanates are stabilized by polyadduct encapsulation in a liquid medium which is not a good solvent for the solid polyisocyanates. Suitable liquid mediums include low molecular weight and preferably relatively high molecular weight compounds with isocyanate-reactive groups B). Plasticizers may optionally also be used.

Stabilization of the isocyanate which is solid at room temperature generally occurs within a few minutes, such that it is possible to perform the stabilization reaction continuously. The nature and quantity of the liquid medium in the stabilization reaction may optionally be selected such that its composition in combination with the isocyanate component A) directly corresponds to that of the heat curable, one-component polyurethane reactive compounds according to the invention.

Suitable relatively high molecular weight compounds having isocyanate-reactive groups B) are selected from di- or higher functional polyhydroxyl or polyamino compounds having 2 to 8, preferably 2 to 6 hydroxyl or amino groups and a molecular weight of 400 to 16,000.

Aliphatic polyether polyamines B1) have previously been disclosed as suitable stabilizers for the surface-modified, finely divided polyisocyanates A).

Suitable polyester polyols B2i) are polyester polyols containing hydroxyl groups, for example, reaction products of polyhydric, preferably dihydric and optionally additionally tri- and polyhydric alcohols with polybasic, preferably dibasic, polycarboxylic acids or their anhydrides or corresponding polycarboxylic acid ester of lower alcohols. Polyester polyols prepared from lactones, for example ε-caprolactone, and polycarbonates are also suitable.

Starting compounds for these polyester polyols are known glycols or mixtures of glycols, e.g., ethylene glycol, 1,2- and 1,3-propylene glycol, 1,4- and 2,3-butylene glycol, 1,6-hexanediol, 1,8-octanediol, neopentyl glycol, 1,4-bis-hydroxymethylcyclohexane, 2-methyl-1,3-propanediol, diethylene glycol, triethylene glycol, tetraethylene glycol and higher molecular weight polyethylene glycols, dipropylene glycol and higher molecular weight polypropylene glycols and dibutylene glycol and higher molecular weight polybutylene glycols. Glycerol, trimethylolpropane, 1,2,6-hexanetriol, 1,2,4-butanetriol, trimethylolethane, pentaerythritol, quinitol, mannitol and sorbitol, formitol and methyl glycoside are less preferred. The glycols for production of the polyester polyols may also, prior to esterification, be etherified to yield low molecular weight ether diols, such as for example bis-(6-hydroxyhexyl) ether or may also be reacted to form ester diols, such as the reaction product of 1 mole of caprolactam and 1 mole of 1,6-hexanediol.

Dicarboxylic acids or dicarboxylic acid derivatives which may be used for production of the polyester polyols include succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and/or trimerized unsaturated fatty acids, and esterified dicarboxylic acids such as terephthalic acid dimethyl ester or terephthalic acid diglycol ester.

Carbonic acid, customarily in the form of its dichloride, phosgene or diphenyl carbonate may be used instead of dicarboxylic acids for the synthesis of polyester polyols.

Preferred polyester polyols are those prepared from glycols having relatively long alkylene residues, such as 1,4-butanediol or 1,6-hexanediol, and having ester and/or carbonic acid ester structures. Polyester polyols produced using lactones, such as caprolactone, or hydroxycarboxylic acids, such as ω-hydroxycaproic acid are also preferred.

Polyether polyols B2ii) are selected from known polyether polyols containing at least 2, preferably 2 to 8, and more preferably 2 to 6 hydroxyl groups. The polyether polyols may be obtained by polymerization of tetrahydrofuran and/or epoxides, such as ethylene oxide, propylene oxide, butylene oxide, styrene oxide or epichlorohydrin with themselves or as mixtures either simultaneously or consecutively. The polymerization may also be conducted using initiators which contain reactive hydrogen atoms, such as water, alcohols, amines, aminoalcohols and phenols. Suitable initiators include ethylene glycol, 1,3-and 1,2-propylene glycol, trimethylolpropane, glycerol, pentaerythritol, 4,4'-dihydroxydiphenylpropane, aniline, ammonia, ethanolamine, diethanolamine, triethanolamine, sorbitol, mannitol and ethylenediamine.

Polyether polyols produced using sucrose as the initiator as described in DE-AS 1,176,358 and 1,064,938 may also be considered according to the invention. Examples are relatively high molecular weight polyoxyalkyene polyols, e.g., polyoxytetramethylene glycols or ethoxylation and/or propoxylation products of low molecular weight di- and polyols or di- and polyamines, such as propoxylated trimethylolpropane, propoxylated ethylenediamine and linear or branched poly-propylene glycol ethers, which may contain ethylene oxide units in random, block or terminal form. Polyether polyols having a functionality of 2 to 6 and predominantly containing primary hydroxyl groups are preferred.

Also suitable are isocyanate-reactive compounds which contain high molecular weight polyaddition or polycondensation products or polymers in finely dispersed or also dissolved form. Such compounds may be obtained if polyaddition reactions (for example reactions between polyisocyanates and amino-functional compounds) or polycondensation reactions (for example between formaldehyde and phenols and/or amines) are prepared in situ in the above-stated compounds containing hydroxyl or amino groups.

Polyamino or polyhydroxyl compounds modified by vinyl polymers, which may be obtained by polymerizing styrene and acrylonitrile in the presence of polyamino/polyether polyamines or polyols or polycarbonates, are also suitable for the process according to the invention. Polybutadienes containing hydroxyl groups are also suitable according to the invention. They yield particularly elastic products with good resistance to hydrolysis.

Further representatives of the stated compounds to be used are described, for example, in High Polymers, volume XVI, Polyurethanes, Chemistry and Technology, edited by Saunders-Frisch, Interscience Publishers, New York, London, volume I, 1962, pages 32 to 42 and pages 44 to 54 and volume II, 1964, pages 5 and 6 and 198 to 199, and in Kunststoff-Handbuch, volume VII, Vieweg-Höchtlen, Carl Hanser Verlag, Munich, 1966, for example on pages 45 to 71 and in DE-A 2,854,384.

Mixtures of the above-stated polyamino or polyhydroxyl compounds may also be used.

In addition to components A) and B) the compositions according to the invention may optionally contain low molecular weight chain extenders or crosslinking agents having at least 2, preferably 2 to 8 and more preferably 2 to 6 isocyanate-reactive groups Examples include low molecular weight polyols having at least 2 hydroxyl groups attached to aliphatic and/or cycloaliphatic groups and molecular weights of 62 to 399. Low molecular weight polyols having hydroxyl groups attached to aliphatic or cycloaliphatic groups are preferred in this connection.

Examples include ethylene glycol, diethylene glycol, triethylene glycol, tetraethylene glycol, trimethyl glycol, 2,3- and/or 1,4-butanediol, 2,5-pentanediol, 1,6-hexanediol, neopentyl glycol, 1,4-bis-hydroxy-ethylcyclohexane, 1,4-dihydroxycyclohexane, terephthalic acid bis(β-hydroxyethyl) ester, 1,4,3,6-dianhydrohexitols, 1,4-monoanhydrotetritols, propylene glycol, dipropylene glycol, tripropylene glycol, tetrapropylene glycol, bis-2-hydroxyethyl-hydroquinone, bis-(2-hydroxyethyl)resorcinol, trimethylolpropane, trimethylolethane, 1,2,6-hexane-triol, glycerol, pentaerythritol, quinitol, mannitol, sorbitol, castor oil and formoses or formitol.

Di- or polyols containing tertiary amine, for example N-methyl-diethanolamine, triethanolamine or N,N'-bis-hydroxyethylpiperazine, are also suitable.

Low molecular weight aromatic di- and polyamines having a molecular weight of 108 to 399, which may also contain amino groups attached to heterocyclic residues of an aromatic nature, are also suitable as optional component C). Suitable aromatic polyamines include p-phenylenediamine, 2,4- and/or 2,6-tolylenediamine, diphenylmethane-4,4'-, -2,4'- and/or -2,2'-diamine, 3,3'-dichloro-4,4'-diaminodiphenyl-methane, 3-($C_1$–$C_8$)-alkyl-4,4'-diaminodiphenyl-methanes, 3,3'-di-($C_1$–$C_4$)-4,4'-diaminodiphenylmethanes and 3,3',5,5'-tetra-($C_1$–$C_4$)-alkyl-4,4 '-diphenyl-methanes, 4,4'-diaminodiphenyl sulphides, sulphoxides or sulphones, 2,4-diaminobenzoic acid esters according to DE-A 2,025,900, and tolylene diamines substituted with one or two ($C_1$–$C_4$) alkyl groups.

Preferred compounds include 3,5-diethyl-2,4- and/or -2,6-diaminotoluene (in particular the technical (80/20) or (65/35) isomer mixtures), asymmetrically tetraalkyl-substituted diaminodiphenyl-methanes, for example 3,5-diethyl-3',5'-diisopropyl-4,4 '-diaminodiphenyl-methane and the isomer mixtures thereof according to DE-A 2,902,090, 4,4'-diamino-benzanilide, 3,5-diaminobenzoic acid ($C_1$–$C_4$) alkyl esters, 4,4'- and/or 2,4'-diamino-diphenylmethane, 4,4',4"-triaminotriphenyl-methane and 1,5-naphthalenediamine.

The compositions according to the invention may also optionally contain known plasticizers D), e.g., esters of phthalic acid, trimellitic acid, adipic acid, sebacic acid, azelaic acid, phosphoric acid, sulphonic acids, oleic acid and stearic acid with compounds containing aliphatically or aromatically bound OH groups, such as alcohols or phenols. Examples of suitable esters include bis-(2-ethylhexyl) phthalate, benzylbutyl phthalate, tris-(2-ethylhexyl) trimellitate, bis-(2-ethylhexyl) adipate, tricresyl phosphate, diphenylcresyl phosphate, diphenyloctyl phosphate, tris-(2-ethylhexyl) phosphate, and ($C_{10}$–$C_{18}$)-alkyl-sulphonic acid phenyl esters. Hydrocarbons, such as butadiene oils or diisopropylnaphthalene, may also be used.

The compositions according to the invention may also optionally contain known polyurethane catalysts, e.g., organo-metallic compounds and tertiary amines.

Suitable organo-metallic compounds include organic compounds of tin, zinc, lead, mercury, iron and bismuth.

Preferred organic tin compounds include tin(II) salts of carboxylic acids such as tin(II) bis-ethylhexanoate and tin(II) stearate; and the dialkyltin salts of carboxylic acids, such as dibutyltin dilaurate, dioctyltin diacetate or dialkyltin ester mercaptides. Preferred organic zinc compounds include zinc bisethylhexanoate or zinc bis-acetylacetonate. Preferred organic lead compounds include lead(II) salts of carboxylic acids, such as lead(II) naphthenate, lead(II) bis-ethylhexanoate, lead(II) stearate, and lead(II) bis-diethyldithiocarbamate. A suitable organic mercury compound is phenylmercuric propionate. An suitable organic iron compound is iron(III) acetylacetonate, while bismuth(III) ethylhexanoate and bismuth(III) neodecanoate are preferred organic bismuth compounds. For reasons of environmental protection and occupational hygiene, catalysts containing lead and mercury are less preferred.

Examples of tertiary amine catalysts include triethylamine, tributylamine, N,N,N',N'-tetramethylethylenediamine, 1,4-diaza-bicyclo(2,2,2)octane, N,N-dimethylbenzylamine and N,N-dimethyl-cyclohexylamine.

Additional catalysts, which may be used according to the invention and details of the mode of action of the catalysts, are described in Kunststoff-Handbuch, volume VII, edited by Vieweg and Höchtlen, Carl Hanser Verlag, Munich 1966, for example on pages 96 to 102. The catalysts are generally used in a quantity of about 0.001 to 10 wt. %, based on the weight of the composition.

The compositions according to the invention may also optionally contain known additives such as dyes, pigments, fillers (such as silica gel, gypsum, talcum, calcium carbonate, barium sulphate, carbon black, activated carbon and metal powder), UV absorbents or stabilizers such as phenolic antioxidants, light stabilizers, surface active additives such as surfactants or flow-control agents, antiblocking agents, silicones, flame retardants and substances with fungistatic and/or bacteriostatic activity, rheological auxiliaries and inert solvents.

As previously described the stabilization reaction, which results in surface-modified, finely divided polyisocyanates may be conveniently performed in the mixture of component B) optionally together with components C), D) and E) and, thus, directly provides one-component polyurethane reactive compositions in ready-to-use form.

The stabilization reaction may also be conducted separately and to prepare surface-modified, finely divided polyisocyanates, which are then mixed in a further processing stage with component B) optionally together with components C), D) and E) to provide the one-component polyurethane reactive compositions in ready-to-use form.

These very readily brushable and sprayable one-component polyurethane reactive compositions are heterogeneous suspensions of the surface-modified, finely divided polyisocyanates in the polyamine and polyol components.

A particular feature of the one-component polyurethane reactive compositions is that above a so-called thickening temperature, which is determined by the quantity and nature of the stabilizing amine, they begin to solidify with virtually instantaneous loss of flow. This means, on the one hand, that just below this temperature a long pot life and long flow paths are possible, while, on the other hand, due to the thickening of the reactive composition which occurs immediately once the thickening temperature is exceeded, flow or dripping is prevented.

The one-component polyurethane reactive compositions according to the invention have the advantage, in particular with regard to a long pot life, that atmospheric humidity does not lead to undesirable blistering during heat curing even after relatively extended storage in the uncured state.

The one-component polyurethane reactive compositions are generally cured under the action of heat at a temperature of 80° to 200° C., preferably 90° to 160° C.

The one-component polyurethane reactive compositions according to the invention are suitable as coating, adhesive, anti-drumming and seam sealing compositions for structures made from sheet metal or non-metallic materials. The use of the reactive composition as a seam sealing composition and underbody sealant in vehicle bodywork construction is preferred, both due to good adhesion onto untreated and cathodically electrocoated sheet steel and because of good long-term flexibility and overbaking resistance.

The invention is further illustrated but is not intended to be limited by the following examples in which all parts and percentages are by weight unless otherwise specified.

EXAMPLES

Raw materials used:

1. T 5000: A polyoxypropylene ether triamine having a molecular weight of 5000 (Jeffamine T 5000 from Texaco), equivalent weight 1667.
2. Polyether polyol: A polyoxypropylene polyoxyethylene ether hexol initiated with sorbitol and having a 13.2% ethylene oxide terminal block, a molecular weight of 12000 and an equivalent weight of 2000 (VPLS 2131 from Bayer AG).
3. Polyester polyol 1: A polyester diol having a molecular weight of 2000, produced from adipic acid, ethylene glycol, diethylene glycol and 1,4-butanediol, and having an equivalent weight of 1000 (Desmophen 1652 from Bayer AG).
4. Polyester polyol 2: A polyester diol having a molecular weight of 2000 and prepared by reacting diphenyl carbonate with the reaction product of 1 mole of 1,6-hexanediol and 1 mole of caprolactone, equivalent weight 1000.
5. $BaSO_4$: Barytes (EWO 423N from Sachtleben).
6. $TiO_2$: Bayertitan R-KB4 from Bayer AG.
7. Silica: Cab-o-sil TS 720 from Cabot Corp., hydrophobized by silanization with trimethylchlorosilane.
8. Catalyst: 30% solution of bismuth tris-neodecanoate in mineral spirits (COSCAT 83 from Cosan Corp.).
9. Silane: γ-aminopropyltrimethoxysilane (Dynasylan AMMO from Dynamit Nobel).
10. T 403: A polyoxypropylene ether triamine having a molecular weight of 403 (Jeffamine T 403 from TEXACO).
11. TDIH: A surface-modified, finely divided polyisocyanate: polyether-polyurethane-modified 3,3'-diisocyanato-4,4'-dimethyl-N,N'-diphenylurea with an NCO content of 21.4% and a grain size distribution maximum of 4 μm, produced from a semi-prepolymer of 94 parts by weight of 2,4-tolylene diisocyanate and 6 parts by weight of polyoxypropylene ether diol, molecular weight 2000, prepared according to DE 3,826,447 (U.S. Pat. No. 5,183,876).

In order to produce the one-component polyurethane reactive compositions according to the invention, a hardener paste based on TDIH is first prepared.

Example 1

Production of a hardener paste based on TDIH (formulation component 12)

44.28 parts by weight of TDIH (II) were uniformly suspended in a mixture of 55.36 parts by weight of polyether polyol (2) and 0.36 parts by weight of T 403 (10) using a dissolver (1 minute at 1800 rpm). The mixture was degassed for half an hour under a vacuum at 25° C. A pourable, stable TDIH paste having a thickening temperature of 95° C. (measured after adding wt. % Catalyst (8)), a viscosity of 60 Pa•s at 25° C. and an available NCO content of 7.81%. The NCO-content is calculated from the total content of NCO groups contained originally in the TDIH, less the NCO groups consumed by T 403, and less the NCO groups consumpted by the OH groups contained in the polyether polyol of the hardener paste during the later curing. The hardener paste remained unchanged in viscosity for at least 6 months at room temperature.

The paste was used in examples 2 to 6 to produce the one-component polyurethane reactive compositions. The formulation ratios are set forth in table 1.

Examples 2 to 6

Pigmented, heat curable, one-component polyurethane reactive compositions

The one-component polyurethane reactive compositions were produced in a standard manner by introducing formulation components (1 to 4) (table 1) into a mixing vessel. The fillers and pigments (formulation components 5 to 7) were added one after the other and dispersed for 30 minutes in a dissolver in such a manner that the temperature did not exceed 80° C. Once the mixture had cooled to room temperature, the additives (formulation components 8 and 9) were added and evenly stirred in for 2 minutes. The hardener paste produced in example 1 (formulation component 12) was then added and the mixture was deaerated and homogenized for 30 minutes in a vacuum mixer. The amounts of the components were selected to obtain an NCO:(OH+$NH_2$) equivalent ratio of 1.25:1.

TABLE 1

Formulations of the one-component polyurethane reactive compositions, examples 2 to 6

| | Example 2 (Comp.) | Example 3 (Comp.) | Example 4 (Comp.) | Example 5 (according to the invention) | Example 6 (according to the invention) |
|---|---|---|---|---|---|
| 1. Polyether polyol | 261.5 | 0 | 181.9 | 114.4 | 106.1 |
| 2. Polyester polyol 1 | 0 | 232.9 | 181.9 | 0 | 106.1 |
| 3. T 5000 | 130.7 | 116.4 | 0 | 87.5 | 159.0 |
| 4. Polyester polyol 2 | 0 | 0 | 0 | 131.1 | 0 |
| 5. $BaSO_4$ | 436.8 | 436.8 | 436.8 | 436.8 | 436.8 |
| 6. $TiO_2$ | 8.7 | 8.7 | 8.7 | 8.7 | 8.7 |
| 7. Silica | 43.7 | 43.7 | 43.7 | 43.7 | 43.7 |
| 8. Catalyst | 1.7 | 1.7 | 1.7 | 1.7 | 1.7 |
| 9. Silane | 4.4 | 4.4 | 4.4 | 4.4 | 4.4 |
| 12. Hardener paste according to Example 1 | 112.5 | 155.4 | 140.9 | 171.7 | 133.5 |

The resulting readily brushable, one-component polyurethane reactive compositions were applied to a thickness of 2 mm onto cathodically electrocoated metal sheets.

The resultant coated metal sheets were stored for a certain time at 23° C. and 55% relative atmospheric humidity in order to test the resistance to atmospheric humidity absorbed in the uncured state (humid storage resistance) and then baked in a circulating air drying cabinet and checked for blister-free curing and a tack-free surface.

In order to test overbaking resistance, an approximately 8 mm thick "bead" of the one-component polyurethane reactive compositions was applied with a cartridge gun onto cathodically electrocoated metal sheets and immediately baked for 30 minutes at 120° C. in a circulating air drying cabinet. Thereafter, the metal sheets were reheated for 30 minutes to 180° C. or 190° C. After cooling to room temperature, the beads were cut up and the appearance of the cured compositions was assessed. The beads should be compact, solid and free of blisters at the cuts.

In order to determine Shore A hardness, the one-component polyurethane reactive compositions were applied to aluminum dishes having a diameter of 5 cm in a thickness of 8 mm and cured for 30 minutes at 120° C. After cooling to room temperature, Shore A hardness was determined according to DIN 53 505.

The test results are summarized in table 2.

|   | Example 2 (Comp.) | Example 3 (Comp.) | Example 4 (Comp.) | Example 5 (according to the invention) | Example 6 (according to the invention) |
|---|---|---|---|---|---|
| Shore A hardness to DIN 53 505 | 54 | 39 | 30 | 70 | 56 |
| Humidity resistance after 1 hour | OK | tacky surface | blistering | OK | OK |
| after 4 hours | OK | not tested | not tested | OK | OK |
| after 64 hours | blistering | not tested | not tested | blistering | OK |
| Appearance after overbaking for 30 minutes at 180° C. | large voids formed by decomposition | not tested | not tested | virtually OK, only very slight foaming | OK |
| 30 minutes at 190° C. | large voids formed by decomposition | not tested | not tested | relatively severe foaming | OK |

OK = meets requirements

Evaluation

The one-component polyurethane reactive composition according to example 2 exhibited adequate humid storage resistance for up to 4 hours, but its overbaking resistance was too low.

The one-component polyurethane reactive compositions according to examples 3 and 4 exhibited no resistance to atmospheric humidity and were also too soft for practical applications. The one-component polyurethane reactive compositions according to the invention of examples 5 and 6 were resistant to atmospheric humidity, even for a period of up to 64 hours in the case of example 6 and have adequate overbaking resistance of up to 180° C. or 190° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat curable, one-component polyurethane reactive composition containing
    A) surface-modified, particulate polyisocyanates, which are solid at room temperature, in which 0.1 to 25 equivalent percent, based on the total number of NCO groups, of the NCO groups are deactivated and
    B) a mixture of compounds having isocyanate-reactive groups and a molecular weight of 400 to 16,000 comprising
        1) 5 to 40 wt. %, based on the weight of component B), of one or more aliphatic polyether polyamines and
        2) 60 to 95 wt. %, based on the weight of component B), of a polyol mixture containing
            i) 10 to 60 wt. %, based on the weight of component B2), of at least one polyester polyol and
            ii) 40 to 90 wt. %, based on the weight of component B2), of at least one polyether polyol with predominantly primary hydroxyl groups,
    wherein surface-modified, particulate polyisocyanates A) are present as a heterogeneous suspension in the polyamine and polyol components B).

2. The composition of claim 1 wherein component A) comprises a member selected from the group consisting of 3,3'-diisocyanato-4,4'-dimethyl-N,N'-diphenylurea, 3,3'-diisocyanato-2,2'-dimethyl-N,N'-diphenyl urea and 3,3'-diisocyanato-2,4 '-dimethyl-N,N'-diphenylurea.

3. The composition of claim 1 wherein component A) comprises a member selected from the group consisting of modification products of 3,3'-diisocyanato-4,4'-dimethyl-N,N'-diphenylurea or 3,3'-diisocyanato-2,2'-dimethyl-N,N'-diphenylurea with long chain polyethers or long chain polyesters.

4. A coating, adhesive, anti-drumming product or sealant prepared from the heat curable, one-component polyurethane reactive composition of claim 1.

* * * * *